US008615280B2

(12) United States Patent
Kramarenko et al.

(10) Patent No.: US 8,615,280 B2
(45) Date of Patent: Dec. 24, 2013

(54) ERROR CORRECTION FOR DTMF CORRUPTION ON UPLINK

(71) Applicant: Research In Motion Limited, Waterloo (CA)

(72) Inventors: Valentina Iquorevna Kramarenko, Milton (CA); Ximing Zeng, Waterloo (CA); Zhigang Ruan, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/856,122

(22) Filed: Apr. 3, 2013

(65) Prior Publication Data

US 2013/0217374 A1    Aug. 22, 2013

Related U.S. Application Data

(63) Continuation of application No. 13/494,699, filed on Jun. 12, 2012, now Pat. No. 8,423,102, which is a continuation of application No. 12/692,951, filed on Jan. 25, 2010, now Pat. No. 8,233,951.

(51) Int. Cl.
*H04B 1/10* (2006.01)
*H04B 7/00* (2006.01)

(52) U.S. Cl.
USPC ............ 455/702; 379/31; 379/77; 379/88.24; 379/93.26; 379/283

(58) Field of Classification Search
USPC .............................. 455/415, 456.4, 417, 414.1
See application file for complete search history.

(56) References Cited

U.S. PATENT DOCUMENTS

| | | | |
|---|---|---|---|
| 5,459,784 A | 10/1995 | Tzeng | |
| 5,724,156 A | 3/1998 | Satou | |
| 5,901,358 A | 5/1999 | Petty et al. | |
| 5,913,189 A | 6/1999 | Lee et al. | |
| 5,997,170 A | 12/1999 | Brodbeck | |
| 6,038,310 A | 3/2000 | Hollywood et al. | |
| 6,208,715 B1 | 3/2001 | Haavisto | |
| 6,236,724 B1 | 5/2001 | Labaton et al. | |

(Continued)

FOREIGN PATENT DOCUMENTS

| | | |
|---|---|---|
| EP | 1566954 A2 | 8/2005 |
| EP | 1705562 A1 | 9/2006 |

OTHER PUBLICATIONS

Extended European Search Report mailed Jul. 2, 2010; in corresponding application No. 10151559.1.

(Continued)

*Primary Examiner* — Vladimir Magloire
(74) *Attorney, Agent, or Firm* — Novak Druce Connolly Bove + Quigg LLP

(57) ABSTRACT

Aspects relate to provision of enterprise call capabilities to mobile devices. For example, a mobile device can indicate, over a data channel, that a PBX is to make a call on its behalf to a called party. The PBX can call back the mobile device, call the called party, and bridge those call legs to establish the call. The mobile device can employ mechanisms that a particular incoming call is made by the PBX. These mechanisms can include using ANI information, sending, and receiving audible verification codes over the voice channel established after answering the incoming call. The verification codes can be selected based different behaviors of the mobile devices.

20 Claims, 12 Drawing Sheets

(56) References Cited

U.S. PATENT DOCUMENTS

| | | |
|---|---|---|
| 6,259,770 B1 | 7/2001 | Greene |
| 6,535,730 B1 | 3/2003 | Chow et al. |
| 6,674,855 B1 | 1/2004 | Karelic et al. |
| 2004/0101128 A1 | 5/2004 | Sauvage et al. |
| 2005/0100121 A1 | 5/2005 | Fouret et al. |
| 2006/0270388 A1 | 11/2006 | Veeramachaneni et al. |

OTHER PUBLICATIONS

Daponte P. et al., Neural network and DSP based decoder for DTMF signals, IEE proceedings: Science, Measurement and Technology, IEE, Stevenage, Herts, GB LNKD-DOI:10.1049/IP-SMT:20000073, vol. 147 No. 1, Jan. 6, 2000, pp. 34-40, XP006014471. ISSN:1350-2344.

Office Action mailed May 16, 2012, in corresponding Canadian patent application No. 2,725,916.

ERROR CORRECTION FOR DTMF CORRUPTION ON UPLINK

CROSS-REFERENCE TO RELATED APPLICATION

This application is a continuation of U.S. application Ser. No. 13/494,699, filed Jun. 12, 2012, which is a continuation of U.S. application Ser. No. 12/692,951, filed Jan. 25, 2010, the entire contents of which are incorporated by reference herein.

FIELD

The present application relates to voice telephony on mobile devices, and more particularly relates to call control and status updating for telephony.

BACKGROUND

Voice telephony remains a major application of interest on mobile devices, such as smartphones. Typically, mobile devices implement voice telephony over circuits (similar to the public switch telephone network (PSTN)), once past the radio access network. In some cases, mobile devices may support a data channel, in addition to a voice channel (e.g., such devices may support concurrent voice and data communications). In such situations, a service provider may perform at least some voice call control functions over the data channel. However, even if a given device supports simultaneous voice and data communications, data communications may not be available on all networks, or may be sporadically unavailable, such that there may be situations where even though a voice call can be made, a data channel is unavailable.

BRIEF DESCRIPTION OF THE DRAWINGS

Reference will now be made, by way of example, to the accompanying drawings which show example embodiments of the present application, and in which.

DESCRIPTION

In general, the present application relates to the control and management of communications. In one exemplary aspect, the present application relates to a telephony method for implementation on a mobile device. The present disclosure includes call control and call status sharing techniques in the absence of a data channel. The telephony method comprises receiving an incoming voice call over a voice channel on the mobile device. The incoming voice call may be from a PBX (or more generally, a platform providing enterprise communication capabilities to mobile devices, for simplicity these platforms are referred herein as a "PBX"). The method includes answering the voice call and sending, from the mobile device, a verification code comprising a series of audible tones, when identifying information for the voice call being received is unavailable to the mobile device. The method allows the voice call to proceed responsive to receiving, at the mobile device, a verification code over the voice channel within a time limit. The method can be employed, for example, where the mobile device has signaled to a PBX that it wants the PBX to make a call on its behalf. The PBX can make the call, and when the called party has accepted the call, the PBX can call the mobile device, and bridge both call legs, establishing the call. These example is by way of explanation, rather than limitation.

Although reference may be made to "calls" in the description of example embodiments below, it will be appreciated that the described systems and methods are applicable to session-based communications in general and not limited to voice calls. Other aspects of the present application will be apparent to those of ordinary skill in the art from a review of the following detailed description in conjunction with the drawings. Embodiments of the present application are not limited to any particular operating system, mobile device architecture, server architecture, or computer programming language.

Figure 1:
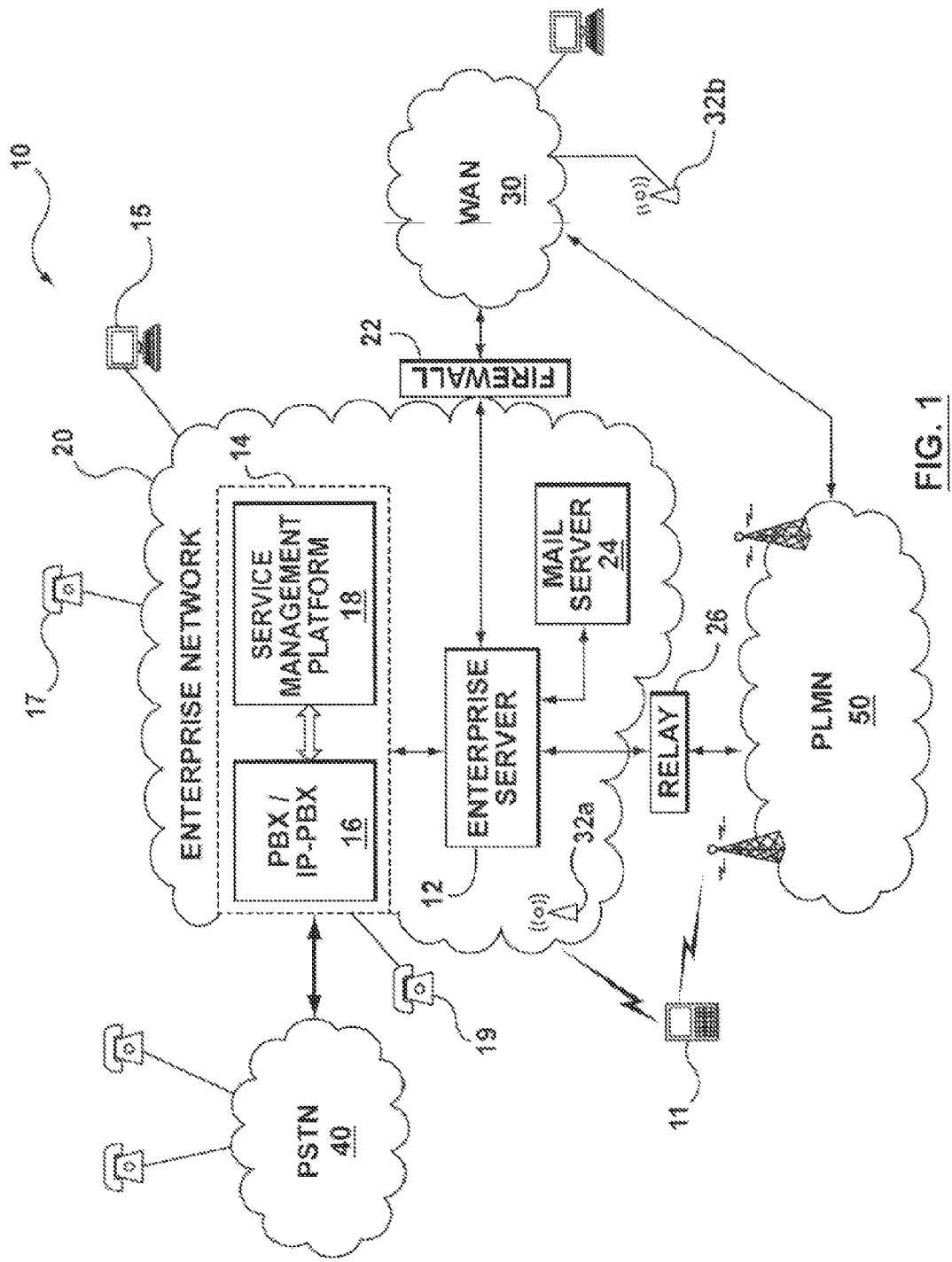
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform (server), generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls.

Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
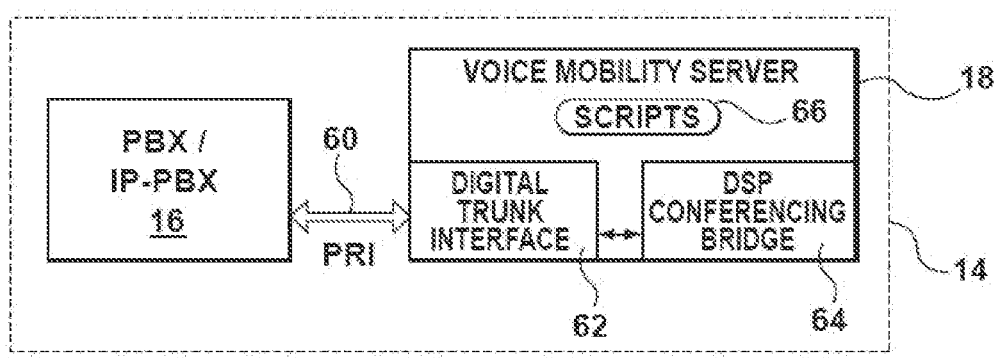
FIG. 2 shows, in block diagram form, further details of an embodiment of the enterprise communications platform.
Figure 3:
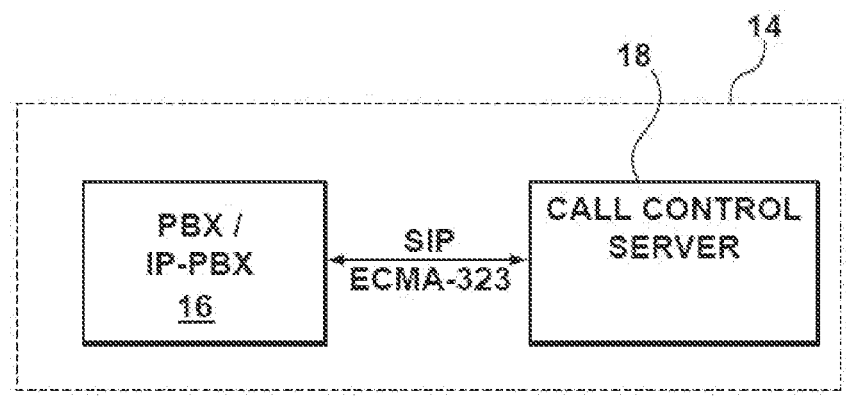
FIG. 3 shows another embodiment of the enterprise communications platform.
Figure 4:
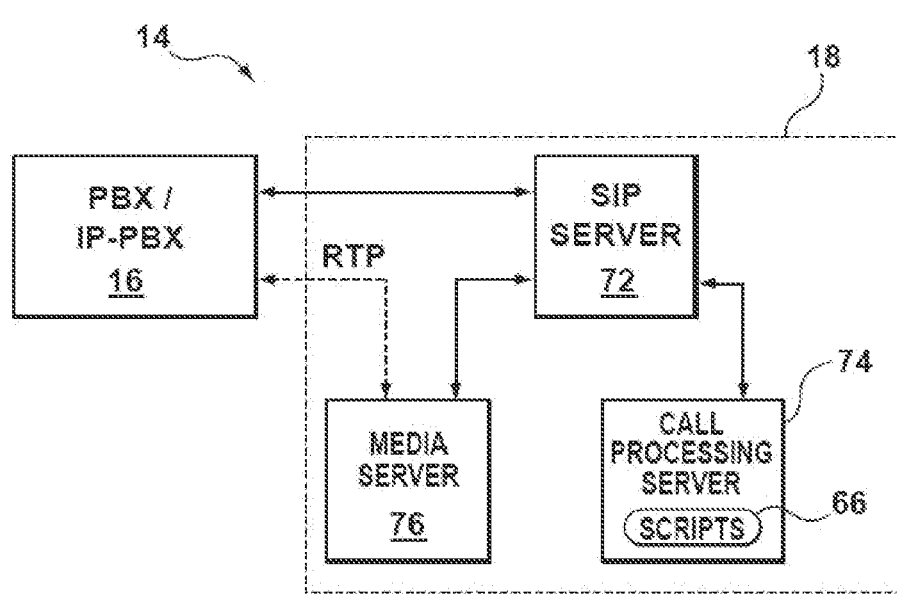
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language," Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
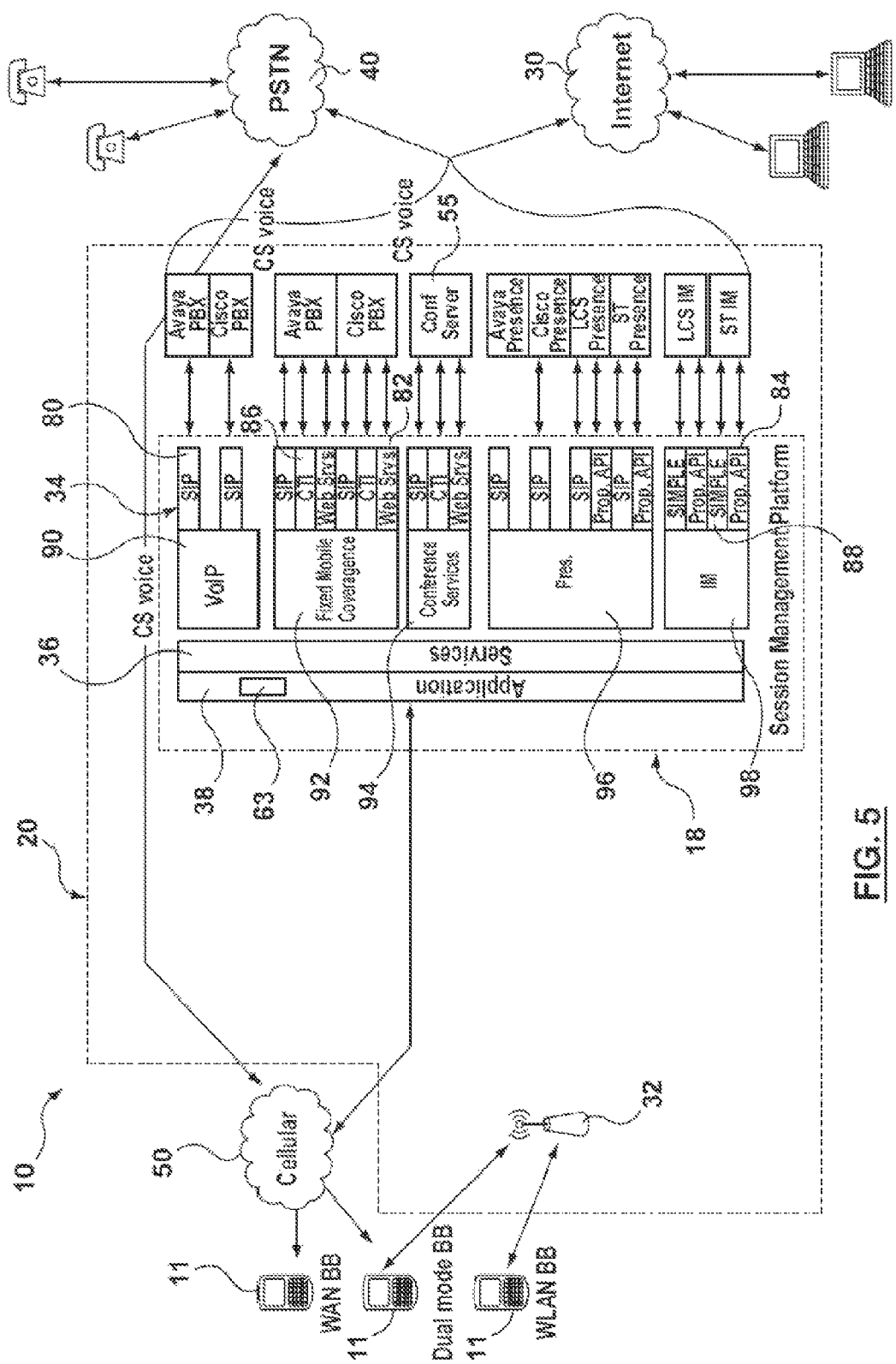
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
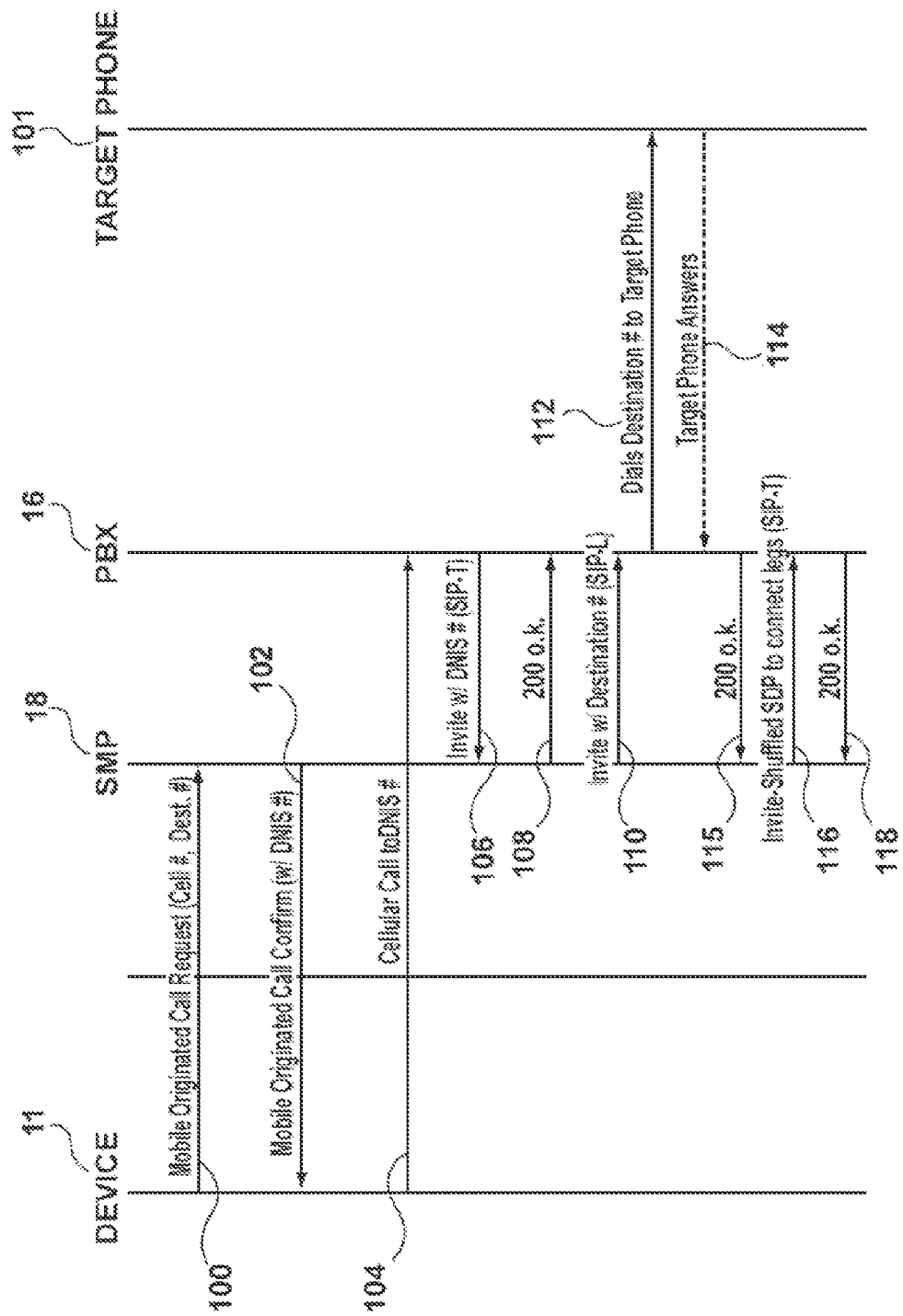
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SDP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it is desirable to localize the ringing tone to match the tone normally heard with a call through the PBX 16.

Figure 6B:
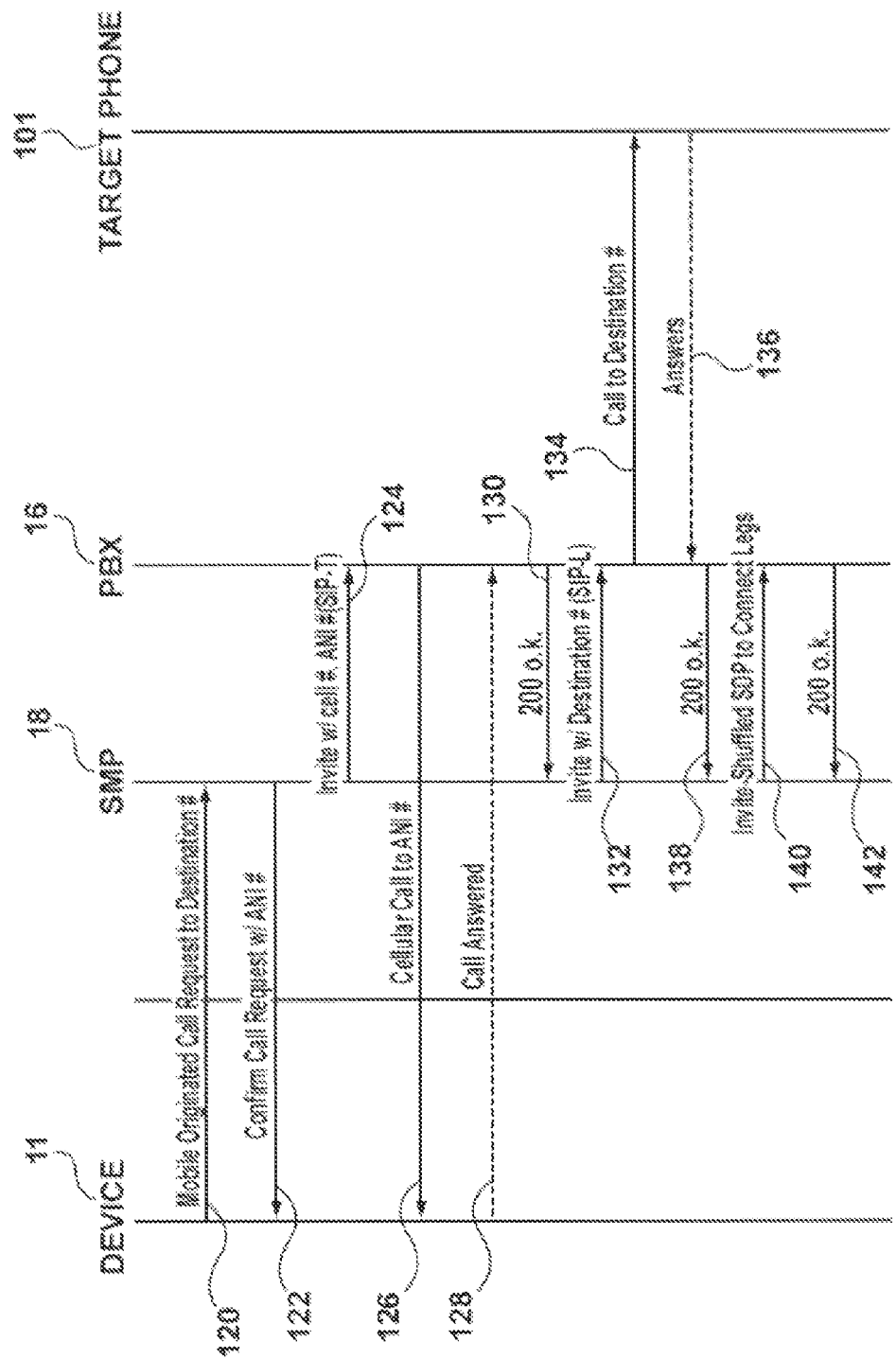
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The SMP 18 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
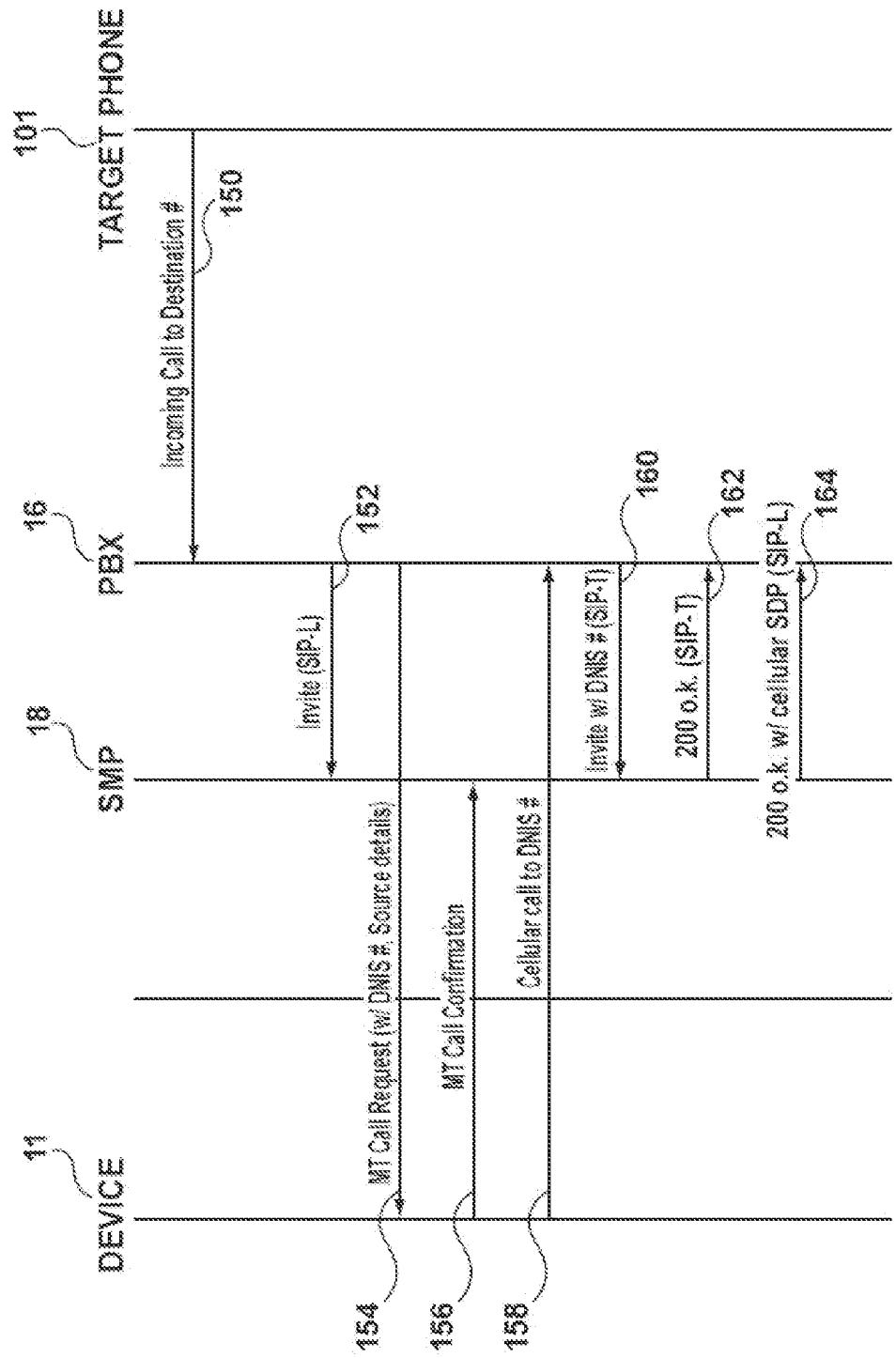
FIG. 7A is a signaling diagram generally indicating how mobile-terminated, mobile-initiated calls are processed by the network of FIG. 5.
Figure 7B:
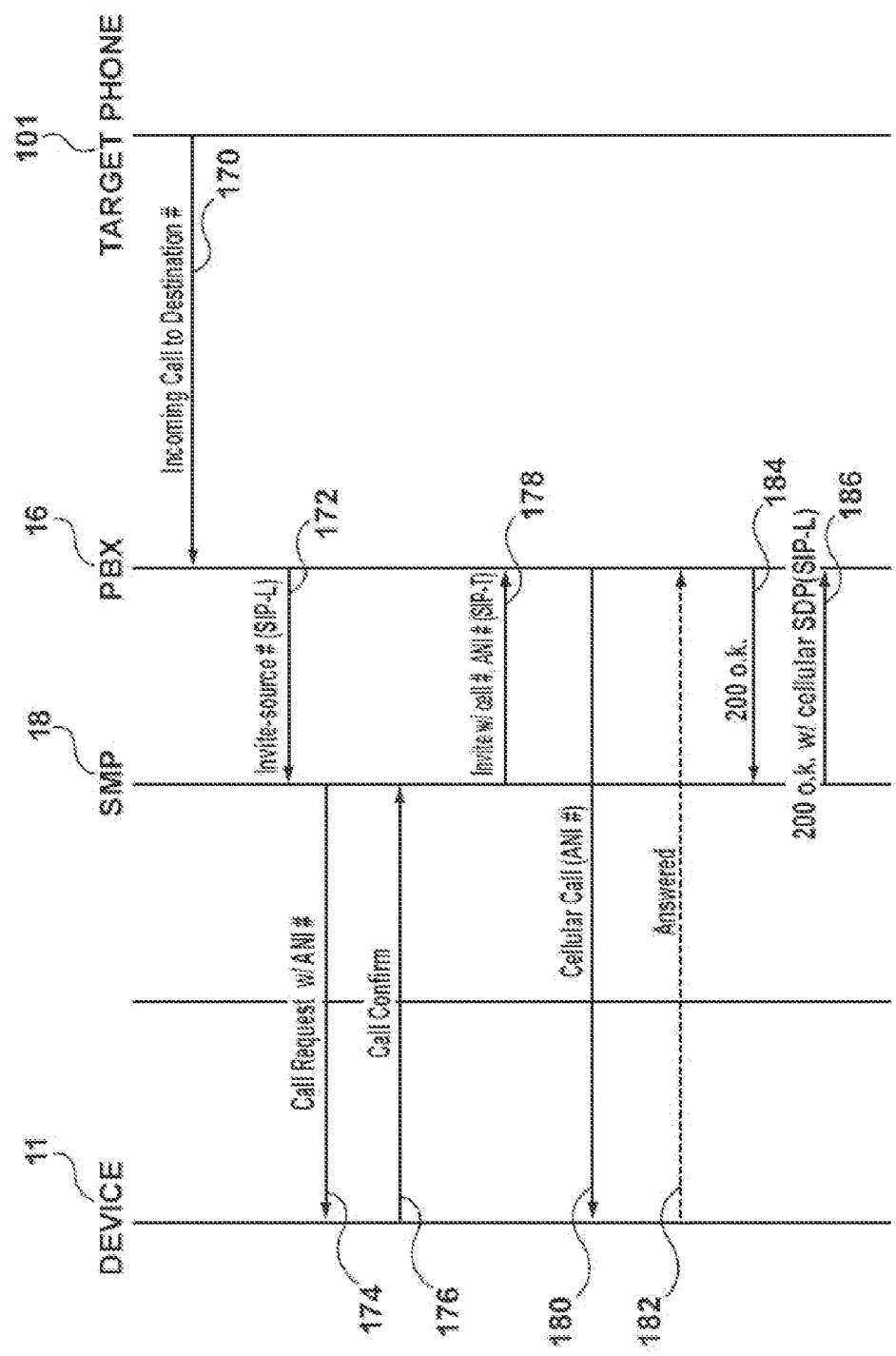
FIG. 7B is a signaling diagram generally indicating how mobile-terminated, PBX-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP, at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the DNIS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SDP to connect the call legs, the call legs are joined, and the target phone 101 and device 11 can communicate with each other on the call.

As discussed above with respect to FIGS. 6A and 6B, the SMP 18 typically remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

FIG. 7B also will be referenced below, with respect to FIG. 11, for describing examples of uplink error correction of DTMF tones used for control commands and status information. In these examples, it can be assumed, for instance, that a data channel between device 11 and one or more of SMP 18 and PBX 16 is unavailable during a telephone call. In such circumstances, device 11 may use the voice channel for the telephone call to send DTMF tones. Such DTMF tones are susceptible to corruption or failure of reception.

Figure 8:
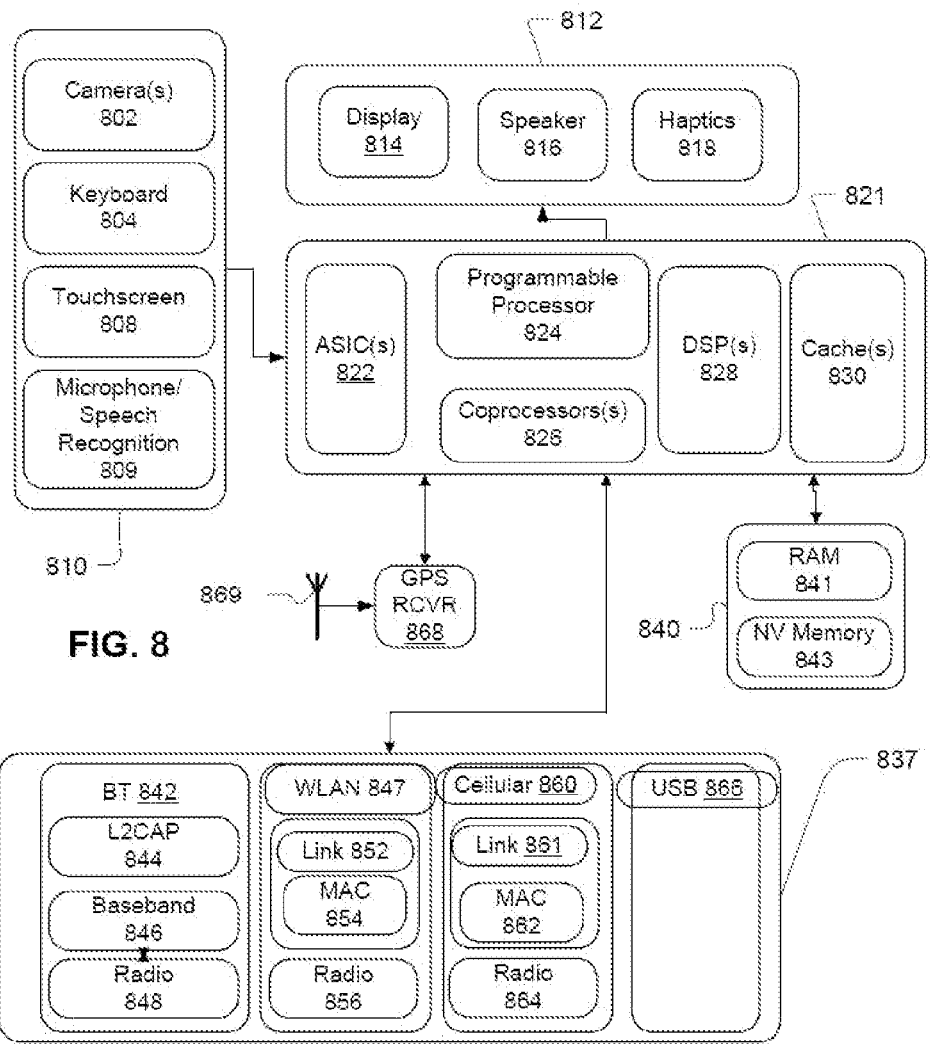
FIG. 8 depicts example of components of an example mobile device.

FIG. 8 depicts example components that can be used in implementing a mobile transceiver device 109 according to the above description. FIG. 8 depicts that a processing module 821 may be composed of a plurality of different processing elements, including one or more ASICs 822, a programmable processor 824, one or more co-processors 826, which each can be fixed function, reconfigurable or programmable, one or more digital signal processors 828. For example, an ASIC or co-processor may be provided for implementing graphics functionality, encryption and decryption, audio filtering, and other such functions that often involve many repetitive, math-intensive steps. Processing module 821 can comprise memory to be used during processing, such as one or more cache memories 830.

Processing module 821 communicates with mass storage 840, which can be composed of a Random Access Memory 841 and of non-volatile memory 843. Non-volatile memory 843 can be implemented with one or more of Flash memory, PROM, EPROM, and so on. Non-volatile memory 843 can be implemented as flash memory, ferromagnetic, phase-change memory, and other non-volatile memory technologies. Non-volatile memory 843 also can store programs, device state, various user information, one or more operating systems, device configuration data, and other data that may need to be accessed persistently.

User input interface 810 can comprise a plurality of different sources of user input, such as a camera 802, a keyboard 804, a touchscreen 806, and a microphone, which can provide input to speech recognition functionality 808. Processing module 821 also can receive input from a GPS receiver 868, which processes signals received from antenna 869. Processing module 821 also can use a variety of network communication protocols, grouped for description purposes here into a communication module 837, which can include a Bluetooth communication stack 842, which comprises a L2CAP layer 844, a baseband 846 and a radio 848. Communications module 837 also can comprise a Wireless Local Area Network (847) interface, which comprises a link layer 852 with a MAC 854, and a radio 856. Communications module 837 also can comprise a cellular broadband data network interface 850, which in turn comprises a link layer 861, with MAC 862. Cellular interface 850 also can comprise a radio for an appropriate frequency spectrum 864. Communications module 837 also can comprise a USB interface 866, to provide wired data communication capability. Other wireless and wired communication technologies also can be provided, and this description is exemplary.

Figure 9:
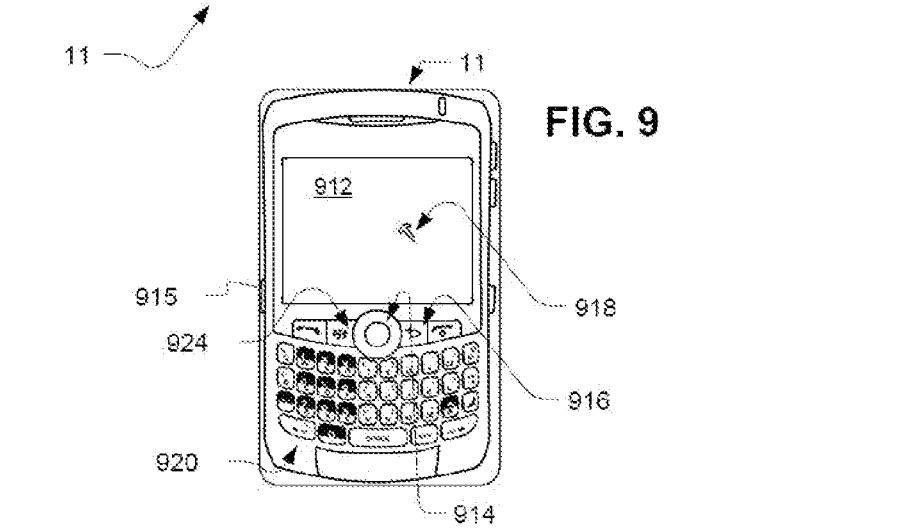
FIG. 9 depicts an example form factor of a mobile device.

Referring to FIG. 9, there is depicted an example of mobile device 11. Mobile device 11 comprises a display 912 and a cursor or view positioning device, here depicted as a trackball 914, which may serve as another input member and is both rotational to provide selection inputs and can also be pressed in a direction generally toward housing to provide another selection input. Trackball 914 permits multi-directional positioning of a selection cursor 918, such that the selection cursor 918 can be moved in an upward direction, in a downward direction and, if desired and/or permitted, in any diagonal direction. The trackball 914 is in this example situated on a front face (not separately numbered) of a housing 920, to enable a user to maneuver the trackball 914 while holding mobile device 11 in one hand. In other embodiments, a trackpad or other navigational control device can be implemented as well.

The mobile device 11 in FIG. 9 also comprises a programmable convenience button 915 to activate a selected application such as, for example, a calendar or calculator. Further, mobile device 11 can include an escape or cancel button 916, a menu or option button 924 and a keyboard 920. Menu or option button 924 loads a menu or list of options on display 912 when pressed. In this example, the escape or cancel button 916, menu option button 924, and keyboard 920 are disposed on the front face of the mobile device housing, while the convenience button 915 is disposed at the side of the housing. This button placement enables a user to operate these buttons while holding mobile device 11 in one hand. The keyboard 920 is, in this example, a standard QWERTY keyboard.

Figure 10:
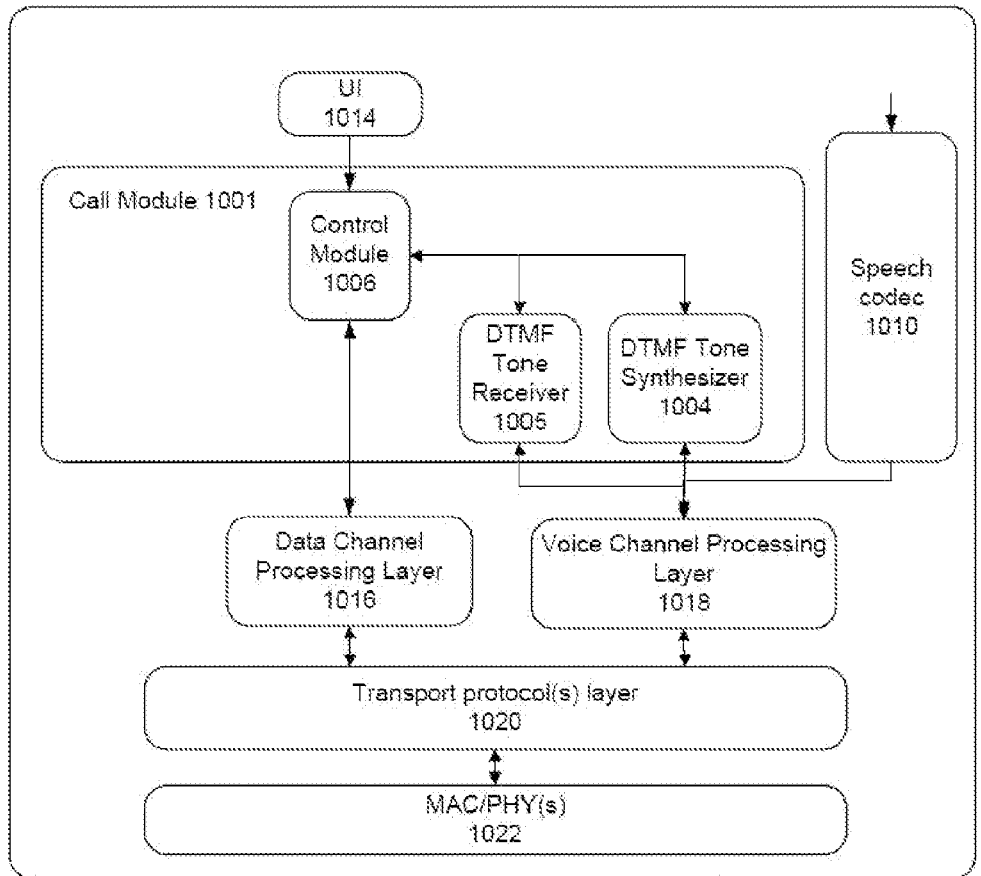
FIG. 10 depicts an example of functional modules that may be provided in a mobile device.

FIG. 10 depicts an example functional module organization of mobile device 11. Call module 1001 identifies a logical organization of modules which can be used for implementing aspects described herein.

The FIG. 10 example of device 11 also depicts a speech codec 1010, which can do one or more of coding and decoding speech obtained or transmitted on the voice channel and a tone injection module 1008. Speech coder 1010 and tone injection module 1008 both can provide inputs to a voice channel processing layer 1018. Both data channel processing layer 1016 and voice channel processing layer 1018 can send and receive data to and from transport protocol(s) layer 1020, which in turn communicates with MAC/PHY 1022.

Figure 11:
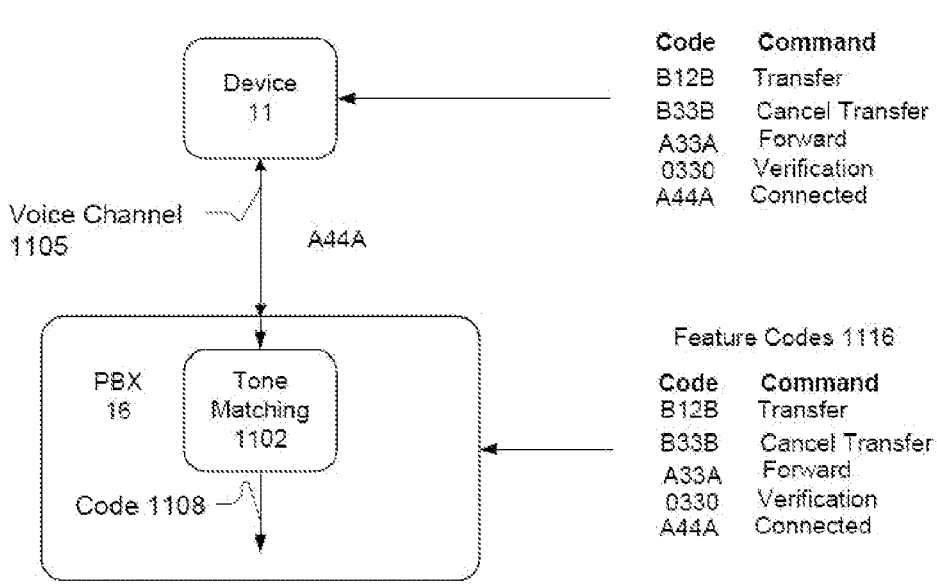
FIG. 11 depicts an abstraction of an example system for in progress command and status updates for a voice call.

FIG. 11 depicts a mobile device 11 that can communicate over a voice channel 1105 with PBX 16, which in an example can comprise a DTMF tone matching module 1102 that finds matches for tones that are detected on voice channel 1105. Each device 11 and PBX 16 can have access to description for DTMF codes that match to given commands or status indicators, and which can be stored on a computer readable medium, represented as feature codes 1116 in FIG. 11. The tones that are defined to indicate such commands or status indicators are used in comparisons with the tones that received on voice channel 1105, and which ultimately can output a command 1108 (generic to command or status information or other information to be communicated). FIG. 11 depicts that feature code A44A was transmitted by device 11 on voice channel 1105.

Figure 12:
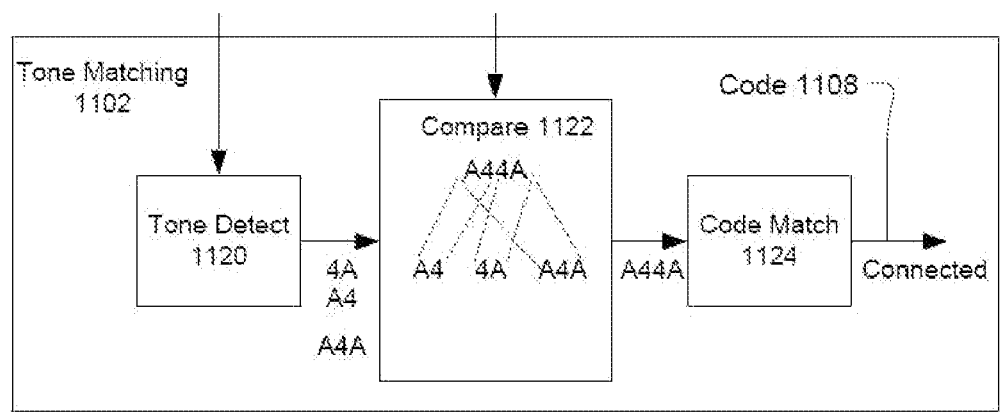
FIG. 12 depicts more detail concerning a module of the system of FIG. 11.

FIG. 12 depicts an example composition of tone matching module 1102. In one example, tone matching module 1102 can comprise a DTMF tone detector 1120, which monitors voice channel 1105 and outputs indicators of DTMF tones that it detects. For example, for the A44 code transmitted, tone detector 1120 can output 4A, A4, or A4A (not necessarily an exhaustive list, but for explanation). In other words, some tones can be lost or not be detected by detector 1120, for any of a variety of reasons. For example, the tones can fail to be detected because SDP ports were being shuffled during a call transfer.

The tones recognized tone are provided to a compare module 1122, which compares the tones provided from detect module 1120 to the tones that represent each feature code. In this example, if tones A4 were detected, then those tones can be matched to a start delimiter (A), and a first informational tone (4). If 4A was received, then the informational tone received (4) can be matched to the last informational tone of the definition, and the delimiter can be matched to the ending delimiter. As such, a code can be reconstructed in the absence of DTMF digit loss. Similarly, if one of the informational tones is lost (either 4), then the received informational tone can be matched to either tone, given the reception of the start and stop delimiter tones. It is preferred that more loss prone situations use redundant informational tones. For example, a command from device 11 to cancel an in-progress transfer preferably is assigned a code that has two or more repeating informational tones.

The tone combination that is determined by compare module 1122 can be provided to a code matching module 1124, which outputs a command/code 1108 that is indicative of the command or status desired to be indicated.

Figure 13:
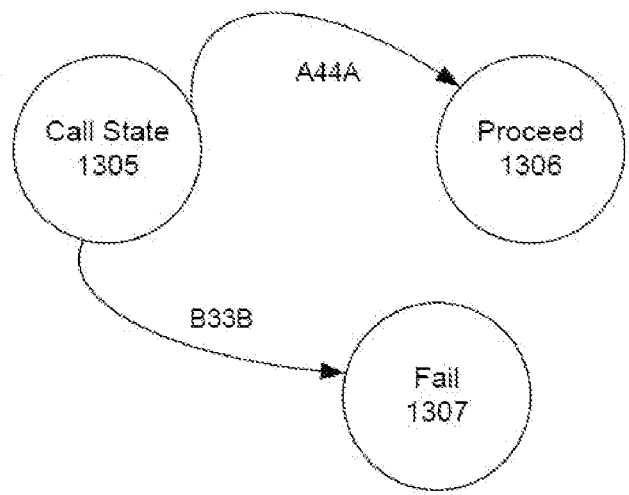
FIG. 13 depicts an example of state-dependent DTMF code translation.

FIG. 13 depicts that compare module 1122 can employ state-dependent analysis techniques. For example, at call state 1305, a next state is proceed 1306 or fail 1307. The code to be received is A44A to advance to proceed 1306. Thus, if a code similar to A44A comes in during that time, compare module 1122 can select proceed 1306. At other times, if A44A is not a code that advances to another available state, then A44A would be less likely to be outputted by compare module 1122.

In this description, tones A, B, C, and D may be referenced, which are defined respectively as a combination of (1) a 1633 Hz tone and (2) a second tone at 697 Hz (for A), 770 Hz (for B), 852 Hz (for C), and 941 Hz (for D). It may be the case that some networks do not support some or all of these tones, and as such, although these tones can be used preferentially as delimiter and/or informational tones, if there is a determination that such tones are not supported for a given network (can be based on network baseband technology, such as GSM versus CDMA), then other DTMF tones can be used. Of course, DTMF tones can be synthesized as well, which are not a priori assigned to a given digit on the keypad, if a given network and device supports such functionality.

Figure 14:
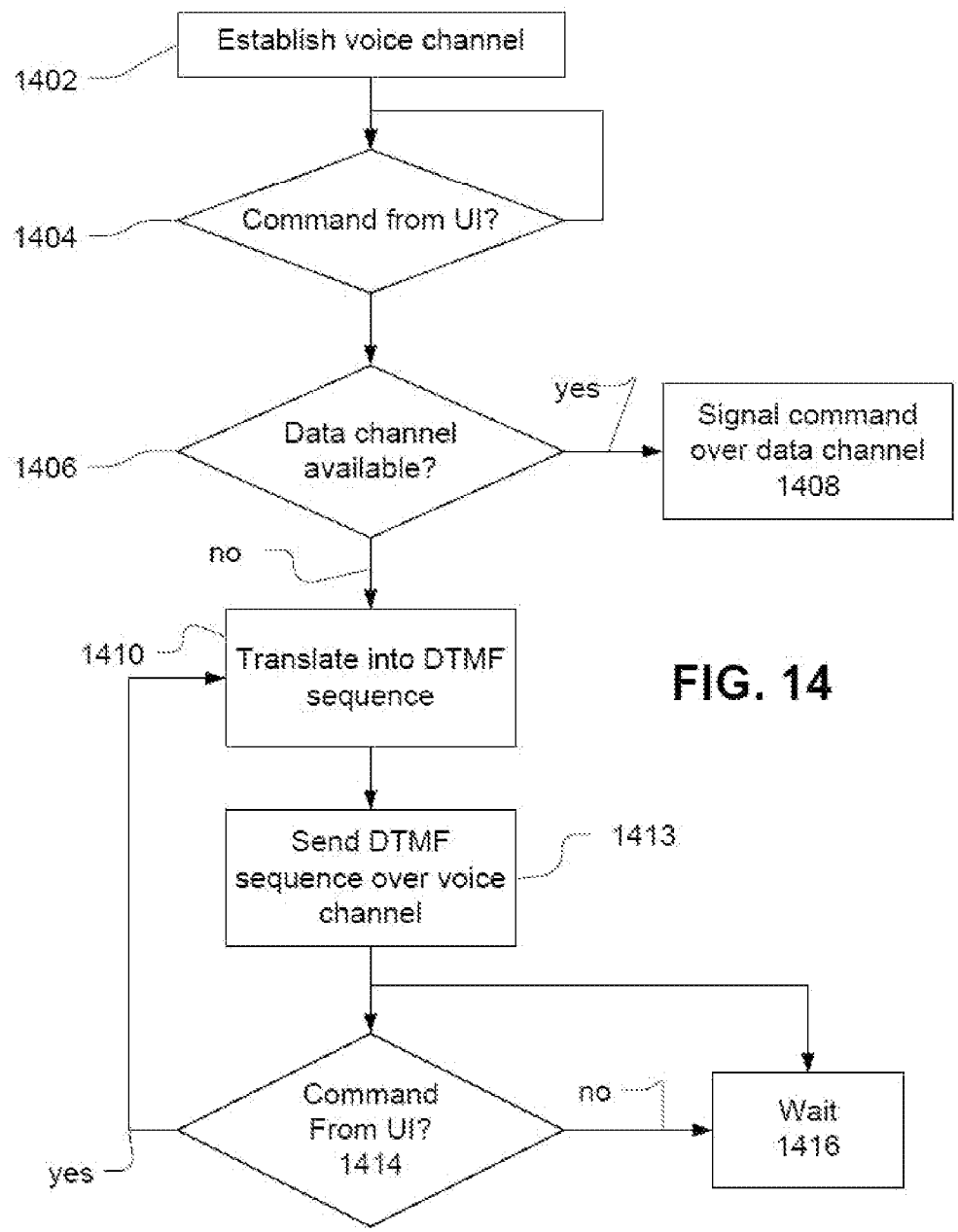
FIG. 14 depicts a method in which a mobile device can participate.

FIG. 14, which depicts a method in which device 11 can participate, includes establishing a voice channel for a call (block 1402). Then, reception of a command from a UI can be monitored (block 1404). If a command is received (e.g., transfer, or cancel), then it can be determined whether a data channel is available (block 1406). If a data channel is available, device 11 can signal (block 1408) the command over the data channel. If there is no data channel available, then device 11 can fail over to using the voice channel for command transfer. For using the voice channel the command is translated into a DTMF sequence (e.g., by looking the command up to find a matching sequence from the stored feature code data 1116 (block 1410)). The DTMF sequence is sent over the voice channel (block 1413). The method further comprises continuing to monitor for additional commands (block 1414), and returning to translation upon detecting such commands. In absence of such detection, the method can wait (block 1416) and monitor. For ease of explanation, the term command was used but more generally, status information, commands, or other information can be transferred according to this disclosure.

Figure 15:
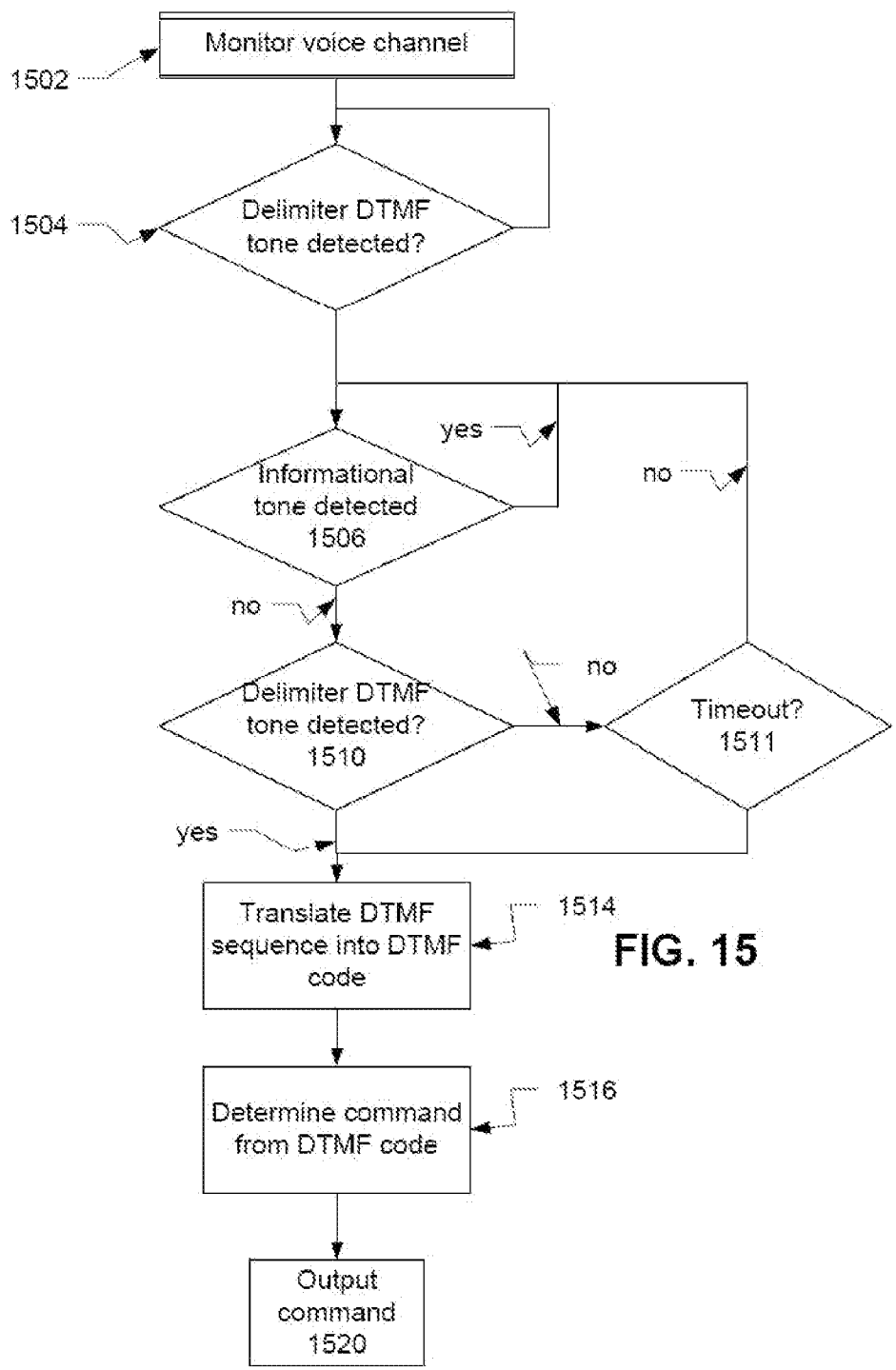
FIG. 15 depicts a method in which a PBX or server that is handling a call with a mobile device can participate.

FIG. 15 depicts a method that can be implemented by a server or PBX 18 in receiving the tones and determining what information is indicated thereby. The method includes monitoring (block 1502) the voice channel to detect a delimiter tone (block 1504). If a delimiter tone is detected then the method waits for detection of an informational tone, and if an information tone is detected (block 1506), the method loops to detect another. If however, the informational tone is not detected, a delimiter tone may be detected (block 1510), which would be the stop delimiter of the tones shown as the feature codes of 1116. Upon reception of such delimiter, the received tones can be translated (1514) into a code (from the list of 1116, for example), and a command can be determined (1516) from the DTMF code determined. The command can be outputted (1520). If a delimiter tone was not detected at block 1510, then a timeout can be sensed (block 1511), and if there was a timeout, then translation (block 1514) can occur with what tones were received. If the timeout did not occur then detection of any of informational tones and delimiter tones can continue, absent reception of the delimiter at block 1510 (i.e., a delimiter received after reception of either a first delimiter tone or at least one informational tone). These figures depict example approaches; however, other implementations are possible that remain logically equivalent to these examples.

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

The invention claimed is:

1. A server system for processing information received over a voice channel during a call, the server system comprising:
   a channel interface configurable to communicate over the voice channel with an electronic device;
   a non-transitory computer readable medium, coupled to the channel interface, storing sequences descriptive of DTMF tones composing each of a group of feature codes;
   a detection module operable to detect tones received on the channel interface;
   a translation module configurable for mapping a detected delimiter tone and at least one detected informational tone, when one or more of the at least two informational tones is not detected, into one of the group of feature codes by matching the composition either to the start delimiter and an informational tone that follows or the stop delimiter and a preceding informational tone; and
   a compare module operable to compare the detected feature code to one or more feature codes expected to be received.

2. The system of claim 1, wherein the compare module compares the detected feature code based on the state of the call.

3. The system of claim 1, wherein the detection module is operative to monitor for information corresponding to at least one feature code available during a call state.

4. The system of claim 2, wherein the translation module translates the detected delimiter tone and the at least one detected informational tones after the stop delimiter is detected.

5. The system of claim 4, wherein the detection module resets after the stop delimiter is received.

6. The system of claim 5, wherein the detection module resets if the stop delimiter is not received with a set time period.

7. The system of claim 1, wherein the call state proceeds to a successive state if the comparator determines an expected featured codes is present.

8. The system of claim 7, wherein the call state fails to proceed if the comparator determines one of the expected featured codes is not present.

9. The system of claim 1, wherein the call state is the state of call functions or call restrictions.

10. The system of claim 9, wherein the call restrictions comprise blocking international calls.

11. The system of claim 9, wherein the call functions comprise interactive voice commands.

12. A system for receiving commands during an in-progress call over a voice channel, the commands based on tone description data for a group of feature codes, each feature code of the group respectively defined by a start delimiter tone, a stop delimiter tone, and a pre-determined number of informational tones, the system comprising at least one non-transitory medium storing instructions which, upon execution by at least one processor of the system, cause the system to:
   receive voice band signals over the voice channel established for the in-progress voice call between a mobile device and a terminating entity;
   identify, in the received voice band signals, a delimiter tone and at least one informational tone but fewer than the pre-determined number of informational tones;
   determine a feature code from the group of feature codes based on the received delimiter tone and the received informational tones; and generate the determined feature code,
wherein the group of feature codes includes a cancel transfer code including a starting delimiter tone comprising a combination of (1) a 1633 Hz tone and (2) two repeating DTMF tones and (3) an ending delimiter tone comprising a combination of (1) a 1633 Hz tone and (2) a tone selected from the set consisting of about 697 Hz, 770 Hz, 852 Hz, and 941 Hz.

13. The system of claim 12, wherein:
identifying, in the received voice band signals, of the delimiter tone comprises identifying either the starting delimiter tone or the ending delimiter tone;
identifying of the at least one informational tone comprises identifying one of two or more repeating DTMF tones; and
determining comprises matching the sequence of the identified delimiter and the one identified informational tone to corresponding tones of the cancel transfer code.

14. The system of claim 12, wherein:
identifying, in the received voice band signals, of the delimiter tone comprises identifying the starting delimiter tone and the ending delimiter tone;
identifying of the at least one informational tone comprises identifying only one of two or more available repeating DTMF tones;
determining comprises matching the sequence of the starting delimiter tone, the one informational tone, and the ending delimiter tone to a corresponding feature code.

15. A telephony system for receiving commands during a call over a channel, the commands based on tone description data for at least one feature code, each at least one feature code defined by a start delimiter tone, a stop delimiter tone, and a pre-determined number of at least two informational tones, the system comprising at least one non-transitory medium storing instructions which, upon execution by at least one processor of the system, control the system to:
receive a signal over the channel;
identify, in the received signal, a delimiter tone and at least one informational tone, but fewer than the pre-determined number of informational tones, when one or more of the at least two informational tones is not detected in the received signal; and
determine a feature code based on the identified delimiter tone and the identified at least one informational tone.

16. The system of claim 15, wherein the determining comprises using a state of the call in determining candidate feature codes for commands useable during that call state.

17. The system of claim 15, wherein the identifying of the delimiter tone comprises identifying either the start delimiter tone or the stop delimiter tone, and the identifying of the at least one informational tone comprises identifying one of two or more repeating DTMF tones.

18. The system of claim 16, wherein the state of the call comprises a call transfer.

19. The system of claim 16, wherein the state of the call comprises that the call has been connected, and the at least one informational tone comprises one tone which is matched to an acknowledgment feature code.

20. The system of claim 18, wherein the determined feature code is indicative of a cancellation of the call transfer.

* * * * *